M. K. GOLDEN.
POWER TRANSMITTER.
APPLICATION FILED JUNE 20, 1908.
931,010.
Patented Aug. 10, 1909.
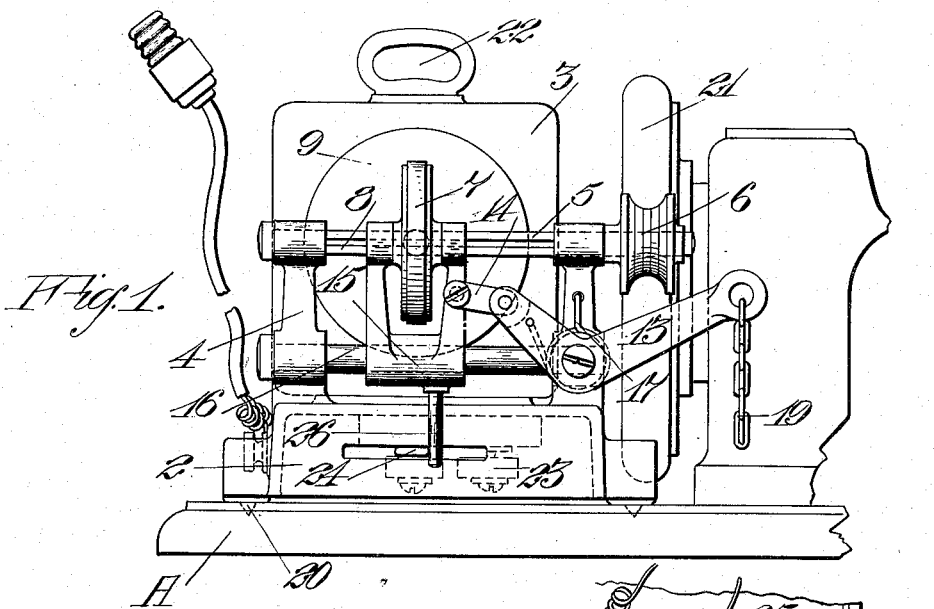
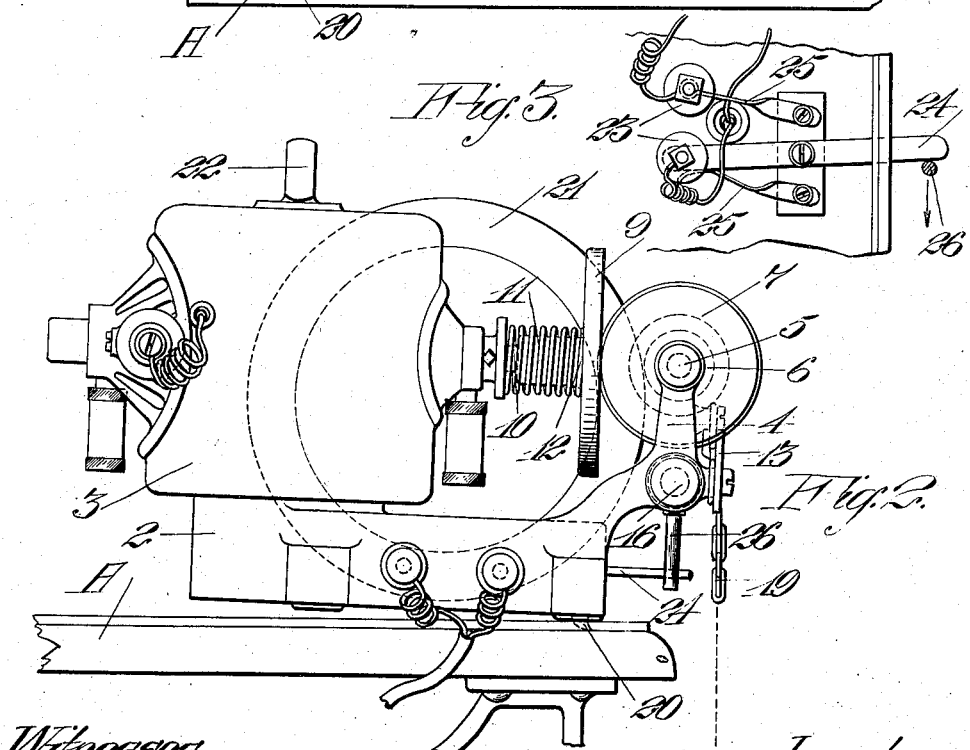
Witnesses.
Inventor.
Maximilian K. Golden
by
Geo. H. Strong.
Atty.

UNITED STATES PATENT OFFICE.

MAXIMILIAN K. GOLDEN, OF SAN FRANCISCO, CALIFORNIA.

POWER-TRANSMITTER.

No. 931,010.   Specification of Letters Patent.   Patented Aug. 10, 1909.

Application filed June 20, 1908. Serial No. 439,486.

*To all whom it may concern:*

Be it known that I, MAXIMILIAN K. GOLDEN, citizen of the United States, residing in the city and county of San Francisco and State of California, have invented new and useful Improvements in Power-Transmitters, of which the following is a specification.

My invention relates to apparatus for transmitting power, and pertains especially to a motor and driving connections for operating various small machines, and the like.

The object of the invention is to provide a simple, cheap, practical, portable apparatus preferably comprising a small electric motor with variable speed drive connections by which any machine, like a sewing-machine or washing-machine, pump, etc., may be operated mechanically; to provide a motor and transmission means which will obviate the use of any belts; and which can be quickly put in position and connected up by any one with the least possible amount of experience or trouble; and it has other objects and advantages which will be hereinafter made manifest.

The invention consists of the parts and the construction and combination of parts as hereinafter more fully described and claimed, having reference to the accompanying drawings, in which—

Figure 1 is a side view showing the application of my invention. Fig. 2 is an end view of same. Fig. 3 shows the construction of the switch.

While I have shown the invention herein applied to a sewing-machine, it will be obvious that its uses are manifold; and I do not desire or intend to limit myself to any particular machine or to any particular use.

A represents the top of a sewing-machine, or any other suitable support for my apparatus, which consists of a base 2 on which is mounted a suitable motor 3, preferably an electric motor as here shown, and provided with suitable detachable drive connections with the machine or apparatus to be driven. The base of my apparatus may be of any appropriate size, style, shape or material; but preferably it is of cast metal, and is provided with a bracket 4 on which is mounted the shaft 5; the shaft 5 being journaled in suitable bearings on the bracket, and carrying a pulley 6 at one end.

A friction roller 7 is slidable lengthwise of the shaft 5, and is made to rotate therewith by suitable means, as the feather and feather-way 8; this roller 7 being movable radially over the face of a friction disk 9 on the shaft 10 of motor 3. Any appropriate means are employed to normally keep the friction disk and friction roller in operative contact. I prefer to mount the friction disk on a sleeve 11 which is turnable with, but slidable on, the motor shaft 10; a spring 12 operating against the disk and against a fixed part of the apparatus normally to press the disk into frictional engagement with the transmission roller 7 when the parts are in operative position. This disk and roller operate in the manner common in such forms of transmission mechanism, to produce variable speed by a suitable movement of the roller radially of the disk.

Any appropriate means may be employed to effect the radial adjustment of the roller.

As here shown, a bell-crank lever 13 is fulcrumed to the bracket, and to one arm of the bell-crank is connected a link 14 which pivotally connects with a carriage 15 which is slidable on a fixed guide rod 16 and has forked arms extending on each side of the roller 7, and between which arms the roller turns. The spring 17 operates on the bell-crank normally to push the carriage 15 to one side, so as to bring the friction roller into the middle of the disk, where it is inoperative and stationary.

Where the apparatus is attached to a sewing-machine, I connect the opposite arm of the bell-crank 13 with the treadle 18 of the machine, by a link or chain 19, so that when the parts are properly assembled, by simply manipulating the treadle with the feet the friction roller 7 is moved back and forth on the friction disk 9 to operate the machine at any appropriate speed.

Any suitable form of drive connection between the drive-shaft 5 and the part to be driven may be employed. In order to simplify the driving connections, and avoid the inconvenience and nuisance arising from using belts, and like connections, I prefer to have the drive pulley 6 grooved, as shown, and the face of this groove lined with a rubber or other friction surface, and to couple up the motor to the machine to be driven by simply engaging two prongs 20 on the front under side of the motor base 2 in corresponding holes in the table A; these holes in the table being so positioned that the usual hand-wheel 21 of the sewing-machine may be engaged by the grooved pulley 6 when the prongs 20 are in the holes. The motor and its base will in effect fulcrum on the prongs 20, or their equivalents, with the motor end of the apparatus sufficiently off of or above the table, whereby the continued frictional contact of the drive pulley 6 with the hand-wheel 21 will be maintained by the weight of the motor.

The motor may be provided with a suitable handle, as 22, by which it can be easily picked up.

The motor is provided with the usual electrical connections, not necessary here to be shown, except that preferably the electric current will be cut in or cut out according as the friction roller 7 is moved from or returned to its normal position of rest centrally of the drive disk 9.

I have here shown two carbon switch points 23, one of which is mounted on a switch lever 24 of insulating material, such as fiber. Springs 25 tend normally to carry these contacts into electrical connection, but this electrical connection is controlled by a pin 26 on the carriage 15 engageable and disengageable with the switch lever 24. That is to say, when the friction roller 7 is in inoperative central position with respect to the disk 9, the pin 26 will have intercepted the switch lever 24 and separated the contacts 23, so that no current passes through the motor. The moment, however, that the bell-crank 13 is rocked so as to move the carriage 15, and thereby shift the roller 7 outward radially of the disk 9, the lever 24 is released, closing the circuit between the contacts 23 and cutting in the electric current, thereby setting the motor shaft and friction disk 9 in motion. It will thus be manifest that no power will be used when there is no need for it, and that by the arrangement and connections here shown the operation of the motor is controlled from the treadle of the machine.

Assuming that the invention is applied to a sewing-machine, as here illustrated, the operation is as follows:

In order to couple the invention to the sewing-machine, the prongs 20 on the base are simply engaged in the holes in the table-top, and by the weight of the motor the friction surface of the drive pulley 6 is pressed against the wheel 21. The bell-crank 13 is then connected to the treadle by the chain 19, and the necessary electrical connections with the motor made. This apparatus is designed to be attached directly to the lighting arrangement of a house or building. To start the motor and the machine, the treadle is operated to shift the roller 7 radially of the disk 9; the speed at which the machine is operated being regulated according to whether the roller 7 is nearer to or farther from the center of the disk.

Releasing the pressure on the treadle allows the spring 17 to act to return the roller 7 to the center of the disk, thereby stopping the machine and cutting off the current to the motor.

It is possible that various changes may be made in the details of construction herein shown and described, without departing from the principle of the invention.

Having thus described my invention, what I claim and desire to secure by Letters Patent is—

1. In a power transmitter, the combination of a rotary part to be driven, of a rotary driving part frictionally engageable with said driven part, a support for said driving part having a fulcruming movement to carry said driving part to and from said driven part, and a motor on said support having connection with the driving part.

2. The combination of a rotary part to be driven, a rotary driving part frictionally engageable with said driven part, a base having an extended bracket, a shaft mounted crosswise in one end of the bracket, said shaft carrying the rotary driving part, fulcrum members on the under side of the base and about which said base is tiltable to carry the driving part to and from the driven part, a motor mounted upon the base, driving connections between the motor and said shaft, and means for tilting the base about its fulcrums, said base operating by gravity to maintain the driving part and driven part in operative engagement.

3. The combination of a rotary part to be driven, a rotary driving part frictionally engageable with said driven part, a support for said driving part having a fulcruming movement to carry said driving part to and from said driven part, a motor on said support with suitable connections with said driving part, said motor operating by gravity on said support to maintain the driving part and the driven part in operative engagement, and means for operating said driving part at variable speeds.

4. The combination of a rotary part to be driven, a rotary driving part frictionally engageable with said driving part, a support for said driving part having a fulcruming movement to carry said driving part to and from said driven part, a motor on said support with suitable connections with said driving part, said motor operating by gravity on said support to maintain the driving part and the driven part in operative engagement, switch connections for cutting the current in and out of the motor, means for shifting said driven part radially of the driving part, and means operative by said shifting means for actuating said switching connections.

5. The combination of a motor having a motor shaft, a friction disk on the motor shaft, a friction roller movable radially of the friction disk, a drive-shaft on which said roller is slidable and with which it is turnable, a driving pulley on the drive-shaft, a rotary part to be driven engageable by said pulley, and means for mounting the motor and said driving connections whereby said drive roller and said part to be driven are maintained in frictional contact by gravity.

6. The combination with a motor and a shaft therefor, a shaft arranged at right-angles to the motor shaft, a rotary driving part thereon, interengaging friction disks between the motor shaft and the second-named shaft, means for shifting one of said disks relative to the other for operating the driving part at variable speeds, and a tiltable base upon which the motor is supported, said base having a bracket extension from one end in which the second named shaft is mounted.

7. The combination of a rotary part to be driven, a treadle, a portable hand-stand, a motor, a support on which the motor is mounted, a shaft for the motor, a friction disk on said shaft, a drive shaft arranged at right-angles with the motor shaft, a friction roller on the drive shaft and slidable lengthwise thereon and radially of the friction disk, a rotary part on the drive shaft for operating the part to be driven, means connected with the treadle for shifting said friction roller radially of the friction disk, said means including a bell crank lever, a link connecting one end thereof with the friction roller and flexible means connecting the other end of the lever with the treadle, and electrical connections with the roller controlled by the movement of the friction disk.

In testimony whereof I have hereunto set my hand in presence of two subscribing witnesses.

MAXIMILIAN K. GOLDEN.

Witnesses:
CHARLES A. ENFIELD,
CHARLES EDELMAN.